(No Model.)

G. KINSEY.
Attachment for Reapers and Mowers.

No. 236,231. Patented Jan. 4, 1881.

WITNESSES:
Chas. Nida.
C. Sedgwick.

INVENTOR:
G. Kinsey
BY
ATTORNEYS.

UNITED STATES PATENT OFFICE.

GOTTLIEB KINSEY, OF LOCK SEVENTEEN, OHIO.

ATTACHMENT FOR REAPERS AND MOWERS.

SPECIFICATION forming part of Letters Patent No. 236,231, dated January 4, 1881.

Application filed September 27, 1880. (No model.)

*To all whom it may concern:*

Be it known that I, GOTTLIEB KINSEY, of Lock Seventeen, in the county of Tuscarawas and State of Ohio, have invented a new and useful Improvement in Attachments for Reapers and Mowers, of which the following is a specification.

Figure 1:
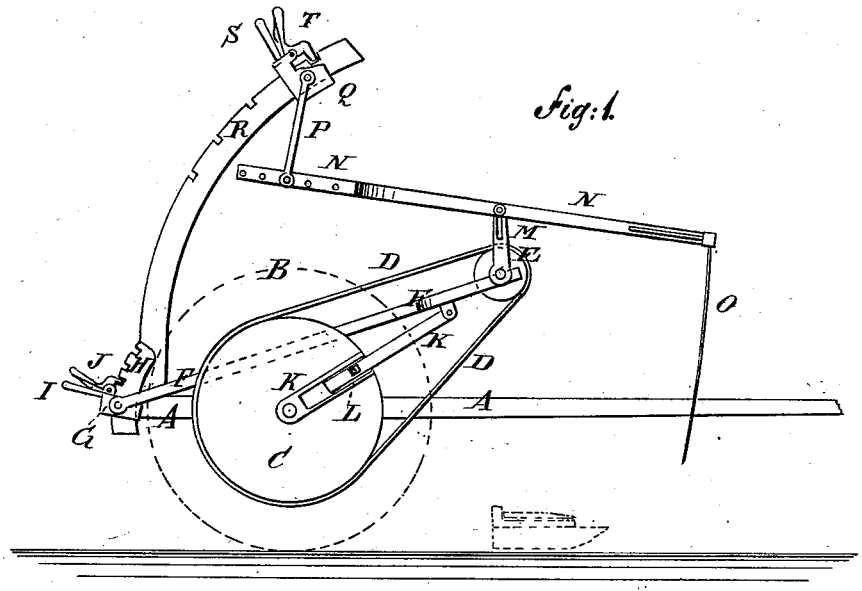
Figure 2:
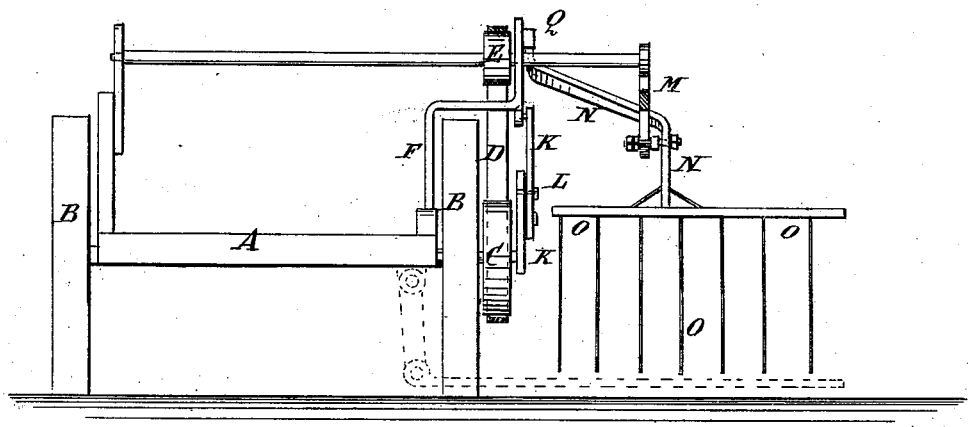

Figure 1 is a side elevation of the improvement. Fig. 2 is a rear elevation, partly in section.

The object of this invention is to furnish attachments for reapers and mowers to take the place of the reels, and which shall be lighter and less expensive in construction than the reels and equally as effective in use.

Similar letters of reference indicate corresponding parts.

A represents the frame-work, and B the drive-wheels, of a reaper or mower. To the drive-wheel B, or to its axle, is attached a large pulley, C, around which passes a belt or chain, D. The belt or chain D also passes around a smaller pulley, E, pivoted to the end of a bar, F. The rear end of the bar F is pivoted to a shoe or keeper, G, which slides upon a curved bar, H, rigidly attached to the frame A, and is provided with a handle, I, for convenience in adjusting it.

To the keeper G is pivoted a spring-catch, J, which engages with notches formed in the convex side of the bar H to hold the keeper G and the bar F in place.

To the bar F, near its forward end, is hinged the upper end of a brace-bar, K, the lower end of which rides upon and is pivoted to the axle of the drive-wheel B. The bar K is made in two parts, the adjacent ends of which overlap each other and are secured in place by one or more bolts, L. One or both of the parts of the bar K are slotted to receive the fastening-bolts L, so that the said bar can be adjusted in length to regulate the tension of the belt or chain D.

To the pulley E, or to its axle, is attached a crank, M, which is slotted to receive the pin by which it is pivoted to the bar or rake handle N, so that the length of the crank, and consequently the movement of the rake, can be regulated as required.

To the forward end of the bar N is attached the rake-head O. In the rear part of rake-handle N are formed a number of holes to receive the bolt by which the said handle is pivoted to the lower end of the bar P, so that the pivoting-point can be adjusted as may be required. The upper end of the bar P is pivoted to a keeper, Q, which slides upon the upper part of the curved bar R, and is provided with a handle, S, for convenience in adjusting it.

To the keeper Q is pivoted a spring-catch, T, to engage with notches formed in the convex side of the bar R and hold the keeper Q and the rear end of the rake-handle N in place when adjusted. The lower end of the curved bar R is rigidly attached to the frame A.

With this construction, as the machine is drawn forward, the rake-head O will be raised, swung forward, lowered, and drawn back, so as to draw the grain or grass against the cutter-bar to be cut.

The movements of the rake can be regulated by adjusting the rear ends of the bars F N by means of the keepers H Q and catches J T.

Having thus fully described my invention, I claim as new and desire to secure by Letters Patent—

1. An attachment for reapers and mowers constructed substantially as herein shown and described, consisting of the pulleys and chain C E D, the bar F, having keeper G and catch J, the notched catch-bar H, the adjustable bar K, the adjustable crank M, the rake-handle N, the rake-head O, the pivoted bar P, having keeper Q and catch T, and the notched catch-bar R, as set forth.

2. The combination, with the frame A, the drive-wheel B, and the rake N O, of the pulleys and chain C E D, the supporting-bars F K, and the crank M, substantially as herein shown and described, whereby the rake will be operated by the advance of the machine, as set forth.

GOTTLIEB KINSEY.

Witnesses:
JOHN F. LITTY,
GEORGE W. KINSEY.